United States Patent [19]

Lott et al.

[11] 4,378,751

[45] Apr. 5, 1983

[54] CONDITION INDICATING DEVICE FOR A PUFFER TYPE LOAD BREAK SWITCH

[75] Inventors: Donald L. Lott, Portland; Guenter G. Schockelt, Tigard; Matthew L. Worrix, Sheridan, all of Oreg.

[73] Assignee: Siemens-Allis, Inc., Atlanta, Ga.

[21] Appl. No.: 306,710

[22] Filed: Sep. 29, 1981

Related U.S. Application Data

[62] Division of Ser. No. 903,694, May 8, 1978, Pat. No. 4,319,105, which is a division of Ser. No. 754,574, Dec. 27, 1976, Pat. No. 4,123,637.

[51] Int. Cl.[3] ........................ G01L 19/12; H01H 9/00

[52] U.S. Cl. ........................ 116/271; 73/729; 200/308

[58] Field of Search ........................ 116/271, 266, 285; 73/729; 200/308

[56] References Cited

U.S. PATENT DOCUMENTS

| | | | |
|---|---|---|---|
| 2,373,055 | 4/1945 | Schier | 116/271 |
| 3,247,824 | 4/1966 | Rodgers | 116/271 |
| 3,411,533 | 11/1968 | Puster | 116/266 X |
| 4,029,041 | 6/1977 | Genshpring | 116/271 |
| 4,107,492 | 8/1978 | Moon, Jr. et al. | 200/309 X |
| 4,139,466 | 2/1979 | Rosaen | 116/268 X |
| 4,237,354 | 12/1980 | Rockerfeller et al. | 73/729 X |
| 4,245,579 | 1/1981 | Bensemann | 116/271 X |
| 4,250,476 | 2/1981 | Evans et al. | 208/308 X |

*Primary Examiner*—Daniel M. Yasich
*Attorney, Agent, or Firm*—Frederick W. Powers, III

[57] ABSTRACT

An easily visible condition indicating device to signify a lack of pressure within the envelope of an electrical interrupter of the type utilizing a pressurized-gas environment. The system includes a rotatable drum contained within a housing having an aperture through which the drum is viewed. When pressure within the interrupter drops a spring-biased bellows collapses, causing the withdrawal of stops which hold the drum in place against spring tension. This allows a biasing spring to rotate the drum so that a different portion thereof, such as a different colored segment, is viewed through the housing aperture in order to provide a visual indication of a low-pressure condition.

3 Claims, 14 Drawing Figures

CONDITION INDICATING DEVICE FOR A PUFFER TYPE LOAD BREAK SWITCH

This is a division of application Ser. No. 903,694 filed May 8, 1978, now U.S. Pat. No. 4,319,105; which is a division of application Ser. No. 754,574 filed Dec. 27, 1976, now U.S. Pat. No. 4,123,637.

BACKGROUND OF THE INVENTION

1. Field of the Invention

This invention relates to air disconnect switches and particularly to air disconnect switches with which a load break interrupter is associated.

2. Description of the Prior Art

Growth of load densities and environmental requirements indicates a need for disconnect switches which incorporate a load break switch that operates reliably with long life and minimum maintenance. The disconnect switch device must also operate with a minimum of noise and eliminate the arcing characteristics usually associated with disconnect switches and of course must be capable of being manufactured at a reasonable cost.

Switches to which the present invention relates are known in the art. The prior art devices operate to first effect initial opening of the interrupter and subsequently effect the opening of the related disconnect blade to thereby completely isolate the circuit. Such an arrangement is disclosed in U.S. Pat. No. 2,769,063 and No. 2,889,434.

U.S. Pat. No. 2,737,556 illustrates a device which utilizes oil as the arc extinguishing medium, while U.S. Pat. No. 2,810,805 discloses a vacuum device arrangement.

All of the known types of interrupter switches utilize the disconnect switch arm to actuate the interrupter. At higher voltages the operating linkages become large and are mechanically unreliable, especially under icing conditions. Higher reliability at low cost can be realized with the arrangement herein set forth. In the present device herein set forth, improvements have been made in a medium capacity interrupter device to make it particularly suitable for interruption operation for ratings of up to and including 230 KV-600 A; and having complete insulation strength between the open contacts at full rating; and having circuit interruption capabilities in pressurized sulfur hexafluoride which eliminates arcing and reduces noise level during operation. The present interrupter has a completely sealed mechanism actuator which is through linkage tightly coupled to the switch blade mechanism, providing positive drive. Also improvement in the current transfer horns have been accomplished which are self-cleaning of ice and self-polishing of oxidation.

SUMMARY OF THE INVENTION

In accordance with the present invention, there is provided an air break disconnect switch having current transfer horns which are constructed to provide ice-freeing engagement therebetween upon opening movement of the switch blade. The transfer horns are also self-polishing to remove oxidation at the contact area so as to establish good electrical contact therebetween. A load break puffer-type interrupter is associated with the disconnect switch and operates in a sulfur hexafluoride medium to effectively extinguish the arc drawn between serially related separable contacts.

A device indicating pressure within the interrupter includes a spring loaded rotatable drum having visible indicia for indicating pressure, or absence thereof, and a pressure-operated actuator means for releasing the drum when pressure within the interrupter drop below a predetermined level.

The operating mechanism for the interrupter is disposed within the sulfur hexafluoride medium whereby no high speed parts of the mechanism are external, reducing the necessity of providing expensive high-speed hardware such as the sealing bellows and related parts thereby eliminating maintenance problems.

DESCRIPTION OF THE INVENTION

Figure 1:
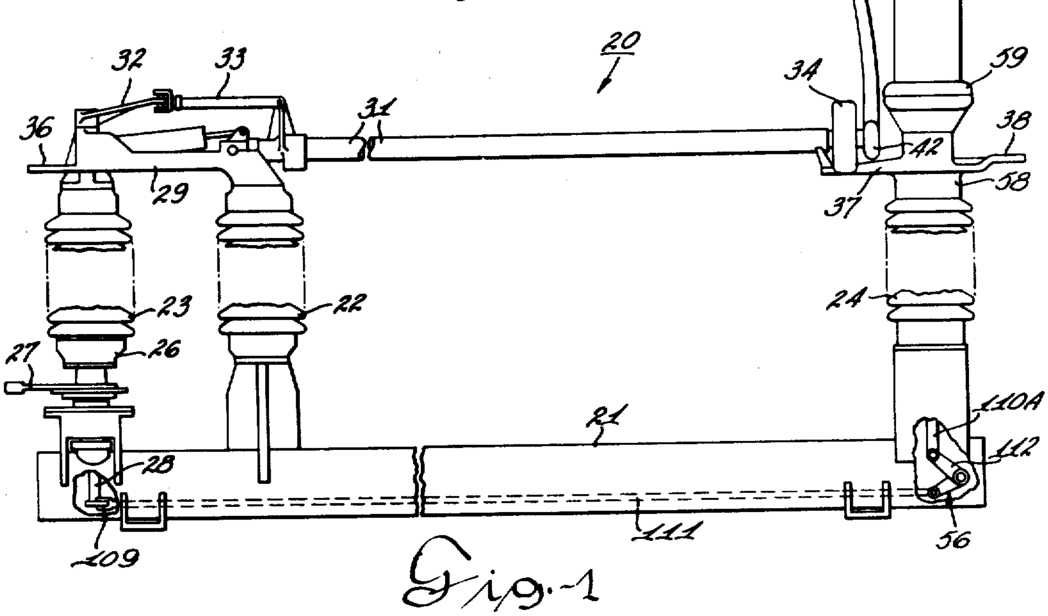
FIG. 1 is a view, inside elevation, of a switch device incorporating the present invention.

Referring now particularly to FIG. 1 of the drawing, it will be observed that the reference character 20 indicates generally a switch device in which the present invention is embodied. The switch device 20 is shown in the horizontal, upright position and includes a base 21 that may be formed of a tubular steel pipe. Mounted on the base 21 are insulators 22, 23 which is rotatable, and a third insulator 24. The insulator 23 is rotatably mounted on a bearing 26 that is carried by the base 21 and has an arm 27 extending therefrom for connection to a suitable operating linkage (not shown). It will be understood that, for a three-phase operation, three of the switch means 20 are mounted on a suitable switching structure in proper spaced relationship, depending on the voltage of the circuit, and that suitable operating means common to the operating linkages (not shown) is provided for effecting simultaneous rotation of the insulator 23 for effecting a simultaneous operation of the switching means for either opening or closing the circuit, as may be required. The operating mechanisms connected to the arm 27 may be of any well-known types and which are believed to be common throughout the art and need no further description herein.

Extending upwardly and rotatable with the insulator 23 is a shaft 28. The shaft 28 extends through a bridging member 29 on which a switch blade 31 is pivotally mounted. The shaft 28 is operatively connected to an arm 32 which is articulately connected to a switch-blade-actuating rod 33 for effecting the rotational and upright vertical movement of the blade 31. As it is swinging in, the switch blade 31 is arranged to move into and out of high-pressure contact engagement with a line contact member 34 which is carried by the insulator 24. It will be understood that, on rotation of the insulator 23, a corresponding rotation of the switch crank 32 is effected for swinging the switch blade 31 out of or into high-pressure contact engagement with the line contact member 34, depending upon the directional rotation of the insulator 23. The bridging member 29 is provided with a terminal pad 36 which receives a line terminal (not shown) in a usual manner. The contact 34 is mounted on a horizontally extending contact-bridging member 37 which terminates in a terminal pad 38 to which a line is connected.

Figure 8:
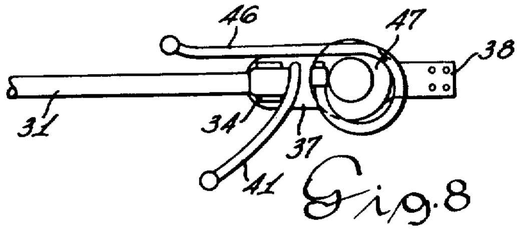
FIG. 8 is a plane view of the switch device of FIG. 1 showing the novel arcing horn arrangement.

Mounted on the swinging end of the switch blade 31 is a movable arc transfer horn. The transfer horn 41 extends generally upwardly and away from the stack 24 curving generally towards the plane in which the axis of the blade 31 lies. The transfer horn 41 is secured to the free end of the blade 31 by means of a corona-free doughnut-type connection 42 and operatively cooperates with a horizontally extending stationary arc transfer horn 46 that is operatively connected to a metallic terminal cap member 47 operatively secured to the upper end of an interrupting device 50. As shown in FIG. 8, the stationary transfer horn 46 curves in a counterclockwise direction and extends horizontally parallel to the axis of the movable blade 31 when the blade is in a closed position as shown. The anchored arrangement of the stationary transfer horn 46 is such that its anchored end is convoluted around the axis of the cap member. This arrangement provides a certain amount of resiliency in the stationary horn which, in cooperation with the movable transfer horn 41, provides good electrical contact between the two members, both in an opening and in a closing operation. As is well known, interrupting switches of the type depicted, the blade 31 in an opening movement is first given rotational impetus which brings the movable transfer horn 41 into physical contact with the stationary transfer horn 46. As the rotated movable blade 31 moves upwardly, as viewed in FIG. 1, the curved configuration of the movable transfer horn 41 physically moves across the surface of the stationary transfer horn 46 in somewhat of a violin-bow fashion to remove any oxidation or ice that may have accumulated on the two members, so that good electrical contact is established and maintained between the two members. Also in a closing operation, if the switch has been opened for a time during a storm under icing conditions where ice buildup is experienced on the stationary transfer horn 46 as well as the movable transfer horn 41, the lowering of the blade to a closed position brings the movable transfer horn 41 into forceful engagement with the resiliently horizontally extending stationary transfer horn 46 which clash removes any ice within the area of engagement of the two members. Again, under these icing conditions, the tight resiliently biased engagement of the two members effects the polishing of this metal so that good electrical contact is made between them.

The switching device 20 includes the current interrupter 50 which operates to prevent the drawing of an arc between the swinging end of the blade 31 and line contact 34 when the circuit is interrupted under load. The arrangement prevents the occurrence of damage to the switch device or the occurrence of a fault by an arc jumping over to an adjacent phase switch or to ground. The interrupter 50 is mounted on the insulator 24 above the line terminal 38. Separable contacts are provided, as will herein often appear, in the interrupter and are operated by mechanism means 55 enclosed within the interrupter 50 itself. Operating drive means 56 enclosed within the base 21 is actuated by the arm 27 through an operator (not shown).

The interrupter includes a sealed insulating envelope or housing 57 which is supported on a metallic base 58. The base 58 receives a cap-shaped member 59 in which the lower end of the envelope 57 is sealed in a well-known manner such as by O-rings or hermetic metal to ceramic seals.

The upper end of the envelope 57 is recessed within a socket formed by the upper cap-shaped member 47 and also sealed therein in gas-tight relationship.

Arc extinguishing means 60 within the porcelain envelope 57 includes a tubular housing 63 of a glass wound insulating material which is substantially coaxial within the envelope 57. The housing 63 extends between the cap members 47 and 59 and is located in position by means of a boss 64 integrally formed on the inner surface of the cap member 47 and a circular groove 66 formed in the inner surface of cap member 59.

Within the housing 63 are a plurality of stationary contacts 67, 67A and 67B. The stationary contacts 67, 67A and 67B are similar and a description of the contact 67 will also apply to the contacts 67A and 67B. The stationary contact 67 comprises an elongated orifice member or nozzle 71 of a suitable material such as fluorocarbon of substantially tubular configuration which is secured in a tubular socket 72. The tubular socket 72 is formed as a part of a stationary cone configured body 73 having an annular flange portion 74. A plurality of pins 75, one of which is shown, extend through the housing 63 and into the flange 74 of the cone body 73 to secure it in fixed position within the housing 63. The cone configured body 73 has a plurality of radially extending fins 76 that are spaced 120° apart, FIG. 10, terminating at a central hub 77, having a bore 78. A resilient stationary contact 79 comprising a plurality of finger contacts is engaged on a downwardly extending centrally disposed nipple of the cone body 73. A shunt rod 82 extends upwardly from the nipple 81 and through the fixed or stationary cone body 73. The resilient contact fingers 79 extend within the nozzle 71 but short of the passageway of the nozzle 71. The arrangement is such that a gas flow passage is formed by the three chute-like chambers 84 formed by the fins 76 and around and also through the contact fingers 79 and through the nozzle 71.

Figure 2:
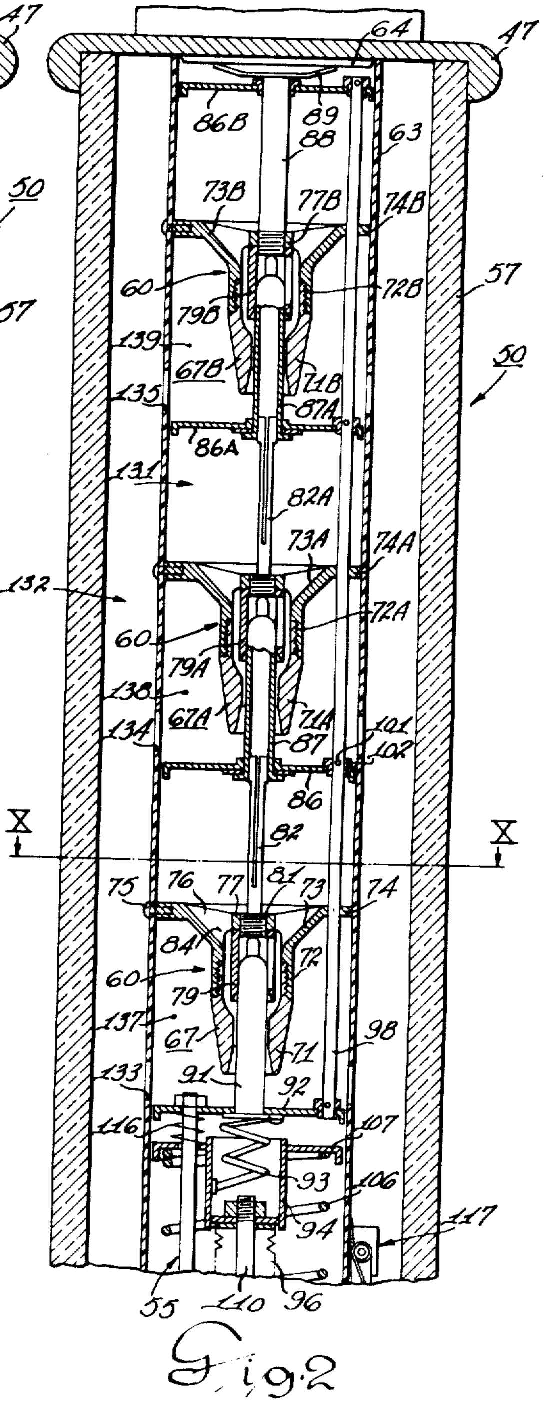
FIGS. 2 and 2A, taken together in end-to-end relationship, are an enlarged view in vertical section through the interrupter that is incorporated in the switch device, with the interrupter in closed position.

Associated with the stationary cone body 74 is an axially movable piston 86 which slidably fits within the housing 63. The piston 86, in switch open condition, is disposed in a relatively close position to the stationary cone body 74 and carries a hollow elongated movable contact 87 which is constructed and arranged to fit over the upwardly extending shunt rod 82. Thus, when the piston 86 is moved upwardly, as viewed in FIG. 3, the movable contact 87 moves upwardly with the piston and enters the nozzle 71. With the piston 86 in its uppermost position, as depicted in FIG. 2, the contact 87 will be in electrical engagement with the resilient contact fingers 79. Thus, with the interrupter 50 in a closed condition, electrical continuity is established between the contact fingers 79A associated with the contact 67A and the contact fingers 79 associated with the contact 67.

The upper stationary contact 67B is provided with an electrically conductive tubular rod 88 which electrically connects with a resilient contact plate 89 that, in turn, electrically connects with the cap member 47. The rod 88 at its lower end is threadedly engaged in the hub 77B associated with the stationary contact 67B and threadedly receives the resilient contact fingers 79B. A movable contact rod 91 associated with the stationary contact 67 has a slightly different arrangement in that the movable contact rod 91 is secured in extending relationship to a movable metallic plate 92.

Figure 2A:
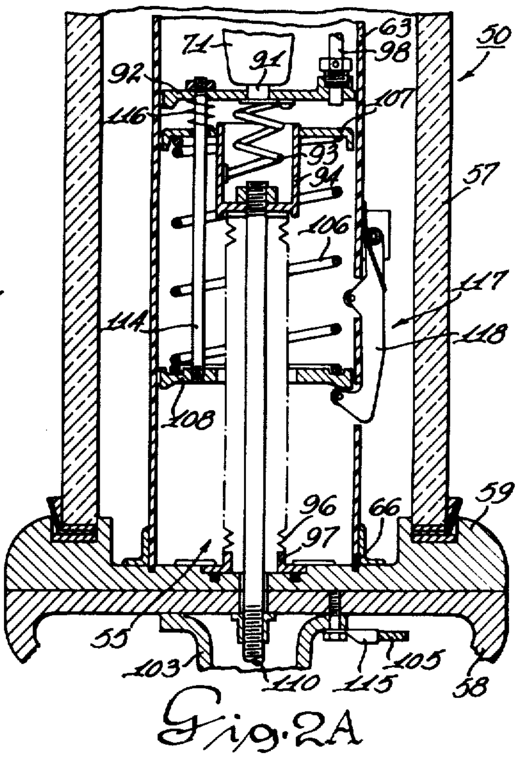

Electrical continuity is established through the interrupter by means of a flexible copper braid conductor 93 which is securely anchored to the metallic plate 92 and also to a tubular hub 94. The hub 94 at its lower end receives a copper bellows 96 which is sealed thereto in gas-tight relationship. Bellows 96 at its lower end, FIGS. 2A and 2B, is secured and sealed to a flanged ring 97 which is fixed to the base cap member 59. With the interrupter 50 in closed condition, as depicted in FIGS. 2 and 2A, electrical continuity is from the bridging member 37, the metallic base 58, lower cap member 59 to the plate 97. The electrical path continues from the plate 97 through the movable rod 110, hub 94, braid 93 to the metallic plate 92. From the plate 92 the electrical path continues through the elongated electrical contact 91 and the contact fingers 79 of contact 67. The established electrical path continues to and through 79B and thence through the shunt rod 82A which is in electrical engagement with the lower end of the elongated contact 87A. The contact 87A is in engagement with the resilient means; thus, the electrical path continues on through the contact 67B to the rod 88, the resilient metallic plate 89 to the upper cap member 47. The path continues from the upper cap member to the stationary transfer horn 46. It will be appreciated that in lieu of shunt rods 82, 82A and 88, flexible conducting braid (not shown) could be utilized if desired.

Figure 9:
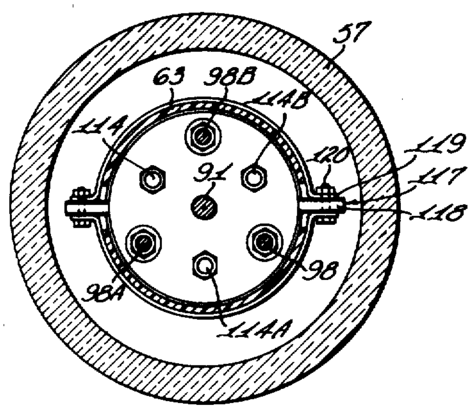
FIG. 9 is a view in horizontal section taken generally in a plane represented by the line IX—IX in FIG. 3A, showing the arrangement of a movable contact piston assembly.
Figure 10:
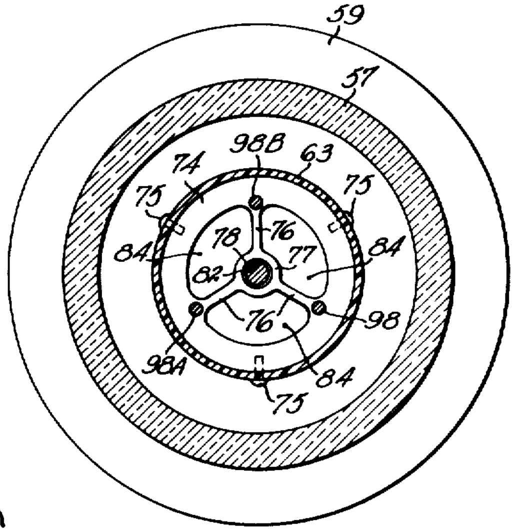
FIG. 10 is a view in horizontal section taken generally in the plane represented by the line 10—10 in FIG. 2, showing the arrangment of a fixed stationary contact nozzle contact.

Movement of the elongated contact members 91, 87 and 87A in an interrupter opening or closing operation is effected simultaneously in a controlled shunt movement. To this end, vertical guide rods 98, 98A and 98B, FIGS. 9 and 10, are provided. In FIGS. 2, 2A, 3 and 3A, only one vertical guide rod 98, for the sake of clarity, is shown. The guide rods 98, 98A and 98B are secured at their lower ends in the plate 92 and at their upper end in the piston 86B. The guide rods extend through suitable openings in the stationary cone bodies 73, 73A and 73B with adequate but not excessive clearance so that movement of the rods relative to the cone bodies can be accomplished with a minimum of interference.

To effect the movement of the elongated contacts 91, 87 and 87A, the piston discs 86 and 86A to which the contacts 87 and 87A, respectively, are secured, the plate 92 to which the contact 91 is secured and the piston disc 86B which moves relative to the fixed rod 88 are all secured to the movable guide rods 98, 98A and 98B. Such connection is accomplished by means of pins 101 which extend through bushings 102 through which the rods slidably extend. The bushings 102 are connected to the respective pistons and the plate 92.

It is beneficial that the switch blade 31 can be completely opened only after the circuit has been previously opened by the interrupter 50. This will prevent the drawing of an arc between the swinging end of the switch blade 4 and the stationary transfer horn when the circuit is interrupted under load or in establishing a fault by the arcing over to adjacent switches or to ground.

The operating mechanism for actuating the interrupter 50 to a closed or open position includes an opening compression spring 106 which is disposed within the lower end of the insulated tubular housing 63 and is captured under a preloaded condition between an upper plate 107 and a lower plate 108. In order for the opening spring 106 to operate in an interrupter opening operation, it must be moved bodily from the lower position it occupies in FIG. 3A to an upper position, as depicted in FIG. 2A, wherein it is in opening ready position. This movement is effected without compressing the spring and is accomplished when the switch blade 31 is in an open vertical position and is moved to its horizontal closed position. Thus, when the arm 27 is operated, either manually or by power, to effect the closing of the blade 31, a vertical insulating rod 110A connected to the electrical conductive rod 110 is moved upwardly by means of linkage 109, a connected horizontal rod 111 disposed within the base 21 and connecting linkage 112. The rod 110 extends inwardly into the housing 63 being surrounded by the bellows 96. At its inner end, the rod 110 is secured to the hub 94 which, as previously mentioned, is secured to the plate 107. The lower end of the rod 110 extends downwardly through a bracket 103 that is attached to the cap 59. The lower end of the rod 110 extends through the bracket 103 and is secured in a metallic fitting 104 carried by the insulated rod 110A. A braid conductor 105 has one end secured to the metallic fitting 104 and its opposite end secured to a stud 115 which is engaged in the cap 59. Thus, electrical continuity is established from the conductor actuating rod 110 to the cap 59 and thence to the terminal pad 38. Extending between and secured to the plates 92 and 108 are a plurality of rods 114, 114A and 114B, the rod 114 being shown in FIGS. 2, 2A, 3 and 3A, with the three rods being indicated in FIG. 9. As shown, the rods 114, 114A and 114B extend through suitable openings in the plate 107 so that free movement of the plate 107 and rods 114, 114A and 114B relative to each other may occur.

Figure 3:
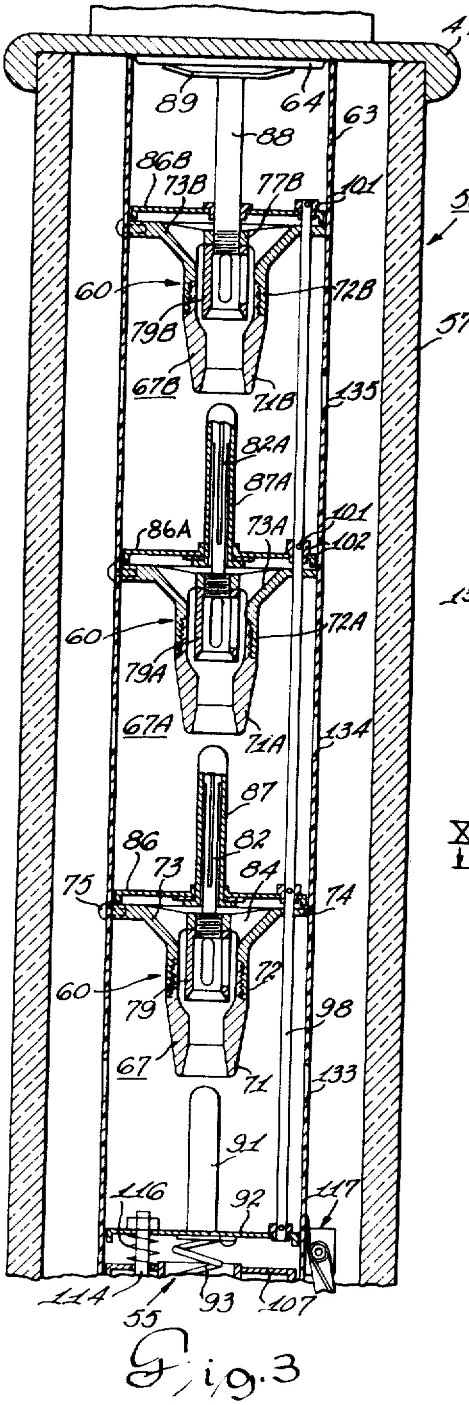
FIGS. 3 and 3A, taken together in end-to-end relationship, are a view similar to FIGS. 2 and 2A, but with the interrupter in open position.
Figure 3A:
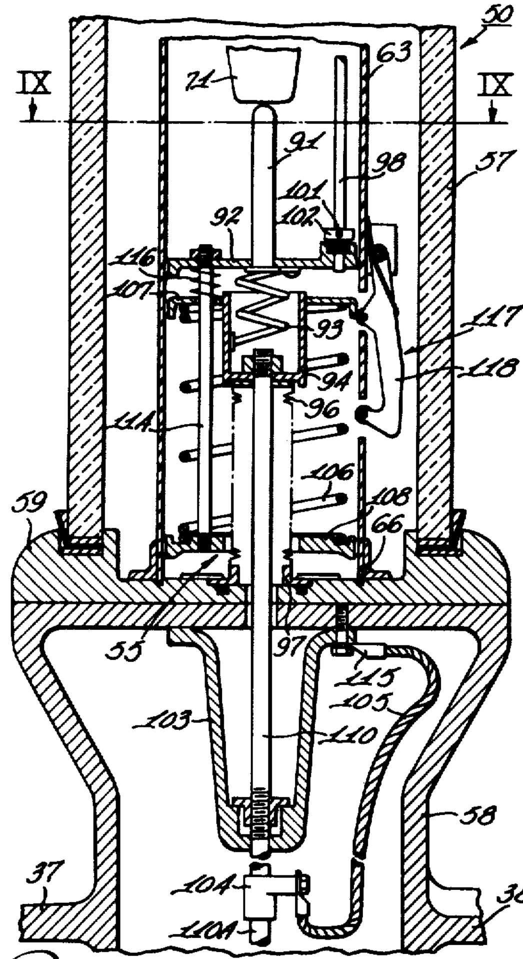

Thus, when the actuating rod 110 is moved upwardly to effect the closing of the contacts of the interrupter 50, the plate 107 will be moved upwardly. At this point in time, the plate 107 will move a small distance in its upward travel with no effect on plates 92 and 108. This travel continues until such time as a plurality of dampening springs 116 associated with each of the tie rods 114, 114A and 114B, the spring 116 associated with the rod 114 being illustrated, are compressed. The springs 116 are disposed around the rod and are captured between the plates 92 and 107. Thus, as the springs 116 are compressed by the upward movement of plate 107, the force from the plate 107 will be transmitted through the springs 106 to the plate 107 forcing this plate to move upwardly. As the plate 92 is moved upwardly being displaced from the position it occupies, as shown in FIG. 3A, towards its final switch closed position, as depicted in FIG. 2A, the lower plate 108, through the tie rods 114, 114A and 114B, will be drawn upwardly with it. Thus, the positions of the plates 107 and 108 relative to each other remain the same and the condition of the spring 106 is not affected.

Figure 4:
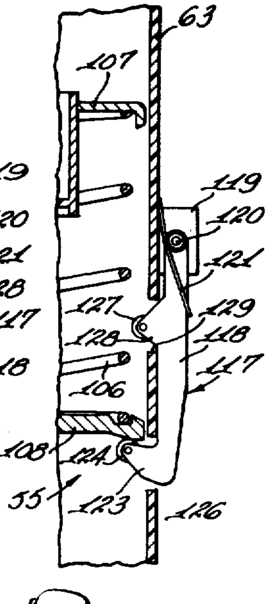

The switch opening means 55 is maintained in its upwardmost switch closed position, FIGS. 2A and 4, in operative readiness for a switch opening operation. To this purpose, a latch means 117 is provided which serves to hold the bolt on plate 108 in the upper position and thus maintain the entire operating mechanism 55 in switch opening ready position. The latch means 117 includes a latch arm 118 which is supported for pivotal movement in a vertical plane between a pair of spaced-apart brackets 119 that are attached to the outer surface of the housing 63. As shown in FIGS. 2A, 3A, 4, 5, 6 and 7, the upper end of the arm 118 is supported for pivotal movement on a pin 120 which is supported by the bracket 119. A spring member 121 mounted on the pin 120 is operatively arranged to urge the latch arm 118 in a clockwise direction. Thus, a latch face 123 formed on the lower end of the latch arm 118 and carrying a roller 124 is urged inwardly into the housing 63 through a port 126. However, this arrangement does not interfere with the upward movement of the plates. As the two plates 107 and 108 are moved upwardly in spaced relationship, the upper plate 107 engages the latch face 123 and displaces the latch arm 118 moving it in a counterclockwise direction allowing the plate to pass. After the plate 107 has passed, the spring 121 biases the arm 118 in a clockwise direction moving the latch face portion 123 under the bottom plate 108 wherein the roller 124 engages a peripheral-sloping surface formed on the under surface of the plate. Consequently, the entire mechanism is latched in switch closed position with the switch opening mechanism 55 readied for a switch opening operation.

In a switch opening operation, the arm 27 is moved in the opposite direction, either manually or by power. The initial rotation of the insulator 23, by the movement of the arm 27, effects the rotational movement of the blade 31 and effects an engagement between the transfer horns 41 and 46 to establish a circuit path. As the rotation of the insulator is continued, the blade arm 31 is caused to pivot upwardly disengaging from the contacts 34. At this time, the rod 110 will be pulled downwardly which, in turn, operates to move the plate 107 downwardly. However, at this time and as indicated in FIG. 4, the plate 108 is latched in up position. This, of course, has the effect of maintaining the contacts 91, 87 and 87A in closed position because the plate 92 is maintained stationary by operation of the rods 114.

Figure 7:
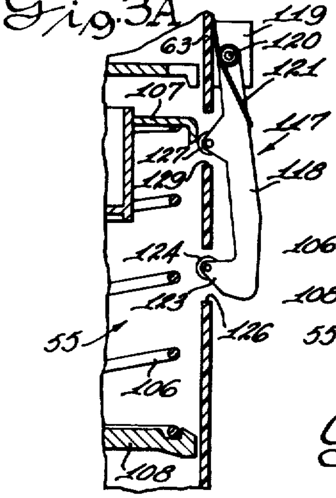
FIGS. 4, 5, 6, 7 are enlarged views of the internal latching arrangement showing the latch mechanism in various positions between switch open position and switch closed position.
Figure 6:
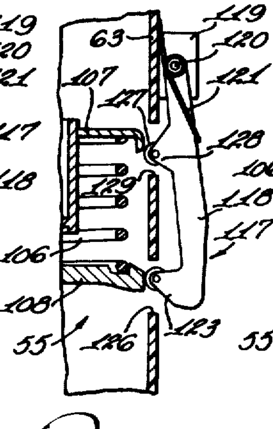
Figure 5:
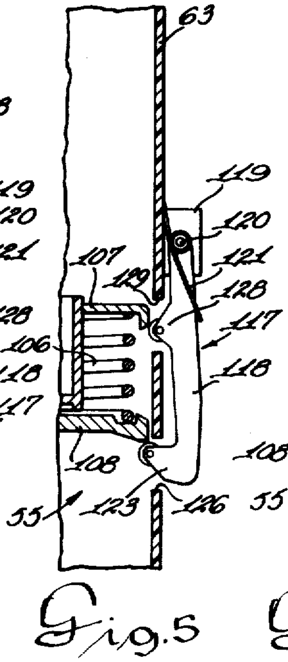

As the blade arm 31 continues its opening movement, the plate 107 will be moved downwardly an additional distance to a position, as depicted in FIG. 5, wherein the peripheral edge of the plate engages a roller 127 which is carried by a projection 128 formed on the latch arm 118. The arrangement is such that the projection 128, as shown in FIGS. 2A and 4, extends inwardly into the housing 63 through a port 129 when the latch arm 118 is biased into latching position. Thus, as the plate 107 is moved downwardly, the peripheral edge thereof engages the roller 127, as depicted in FIG. 5. A slightly additional downward movement of the plate 107 will effect a displacement of the latch arm 118 outwardly, as depicted in FIG. 6, releasing the lower plate 108. With plate 108 latched and the plate 107 being moved downwardly, the spring 106 is compressed. Thus, when the latch face 123 is removed from under the plate 108, the stored energy in the spring 106 is released and acts on the plate 108. This action causes the plate 108 to move rapidly to its full bottom position, as depicted in FIG. 7. This rapid movement of the plate 108 pulls the plate 92 downwardly thereby moving the contacts 91, 87 and 87A to an open position, as depicted in FIGS. 3 and 3A. As this occurs, the switch arm 31 continues to move to a full open vertical position and the transfer horns 41 and 46 part. Shock is effectively absorbed by operation of the damper springs 116.

The envelope 57 is charged with an insulating gas such as sulfur hexafluoride. To permit the passage of the gas between a chamber 131 of the housing 63 and a chamber 132 between the envelope and the housing, the housing 63 is provided with a plurality of sets of ports 133, 134 and 135. Thus, as the pistons 86, 86A and 86B move downwardly in a contact opening operation, they compress the insulating gas ahead of them. As the gas pushed by the pistons moves through the cone bodies 73, 73A and 73B, respectively, the fins 76 serve to prevent turbulence of the gas as it passes through the cone bodies of the stationary contacts.

Each of the sets of ports 133, 134 and 135 are associated with one of said stationary contacts. Thus, the chamber 131 is subdivided into three piston chambers 137, 138 and 139 which are closed at one end but at the opposite end are vented by the ports 133, 134 and 135, respectively. As the pistons are caused to move downwardly, as viewed in FIG. 1, in a contact opening operation, the gas in the associated piston chambers 137, 138 and 139 is compressed as the volume of each of the chambers is reduced. The compressed gas in each of the piston chambers is directed through the cone bodies 73, 73A and 73B of the individual stationary contacts 67, 67A and 67B and through the contact orifices 71, 71A and 71B thereof. It will be appreciated that the rapid gas-compressing movement of the pistons is accompanied by the rapid retraction of the movable contact from engagement with the stationary contacts, thus, initiating an arc between the resilient contact fingers 79, 79A and 79B and the ends of the movable contacts. The compressed gas flowing through the orifices quickly extinguishes the arc.

A gas evacuation and filler means 145 is provided whereby insulating gas under pressure may be provided to the interior of the interrupter 50. To this end, the filler means 145 includes a housing 146 having an access cap 147 which is sealed to the housing 146. Within the housing 146 there is a filler tube 148 which extends downwardly through a bore 152 formed in a stud member 151 and free of the wall thereof. At its lower or inner end, the tube 148 terminates above the stationary cap member 47 to which the housing 146 is secured. As shown, the axis of the filler tube 148 coincides with the axis of an access opening 153 formed in the cap member 47. The lower end of the tube 148 receives the inwardly extending flange 154 of a bellows 156. A hermetic seal is effected between the tube 148 and the flange 154. At its lower end, the bellows 156 is provided with a collar portion 157 which extends into the opening 153. A metallic circular diaphragm is brazed to the collar 157 and extends radially outwardly and is brazed to the undersurface of the cap 47. Thus, insulating gas under pressure is pumped into the interrupter housing 50 through the tube 148. When sufficient pressure within the housing 50 is realized, the upper end of the tube 148 is pinched and sealed.

Figure 12:
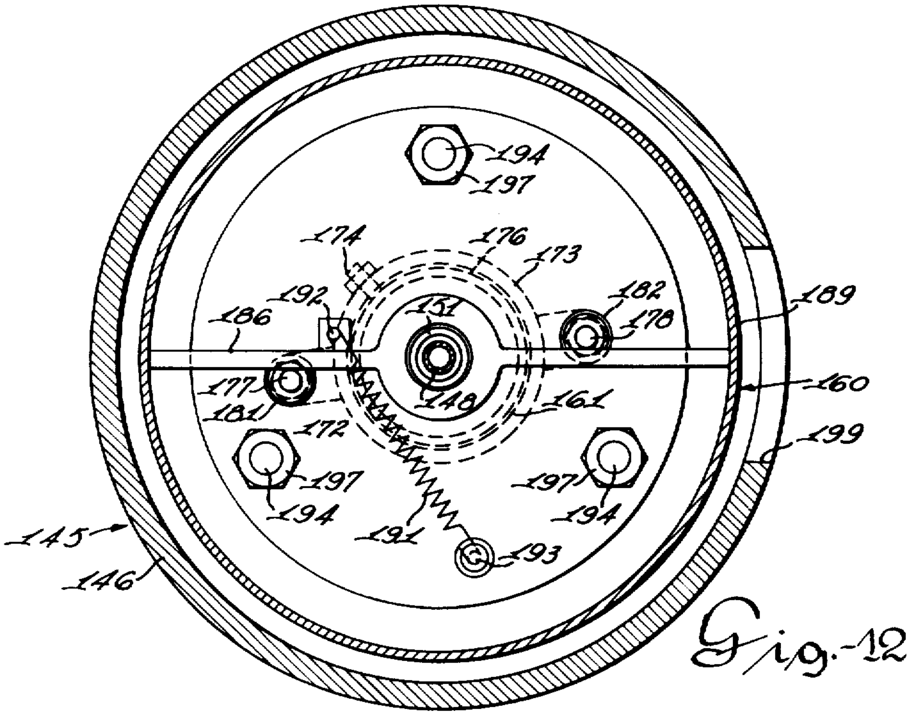
Figure 11:
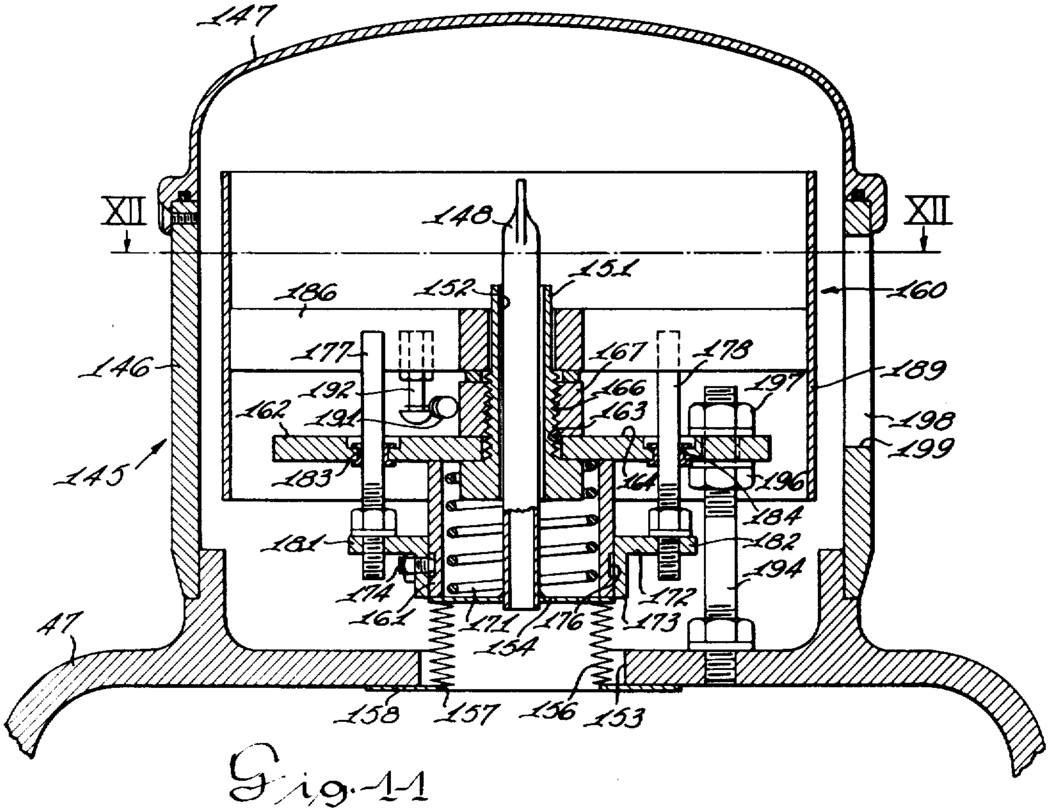
FIG. 11 is an enlarged fragmentary view of the upper portion of the interrupter in vertical section showing a pressure condition indicator device; and, FIG. 12 is a view in horizontal section taken through the pressure condition indicator in a plane represented by the line XII—XII in FIG. 11.

To indicate low pressure within the interrupter 50 at which pressure it would be unsafe to operate the interrupter, pressure signal means 160 is provided within the housing 146. The pressure signal means comprises a rotatable drum having invisible indicia and actuator means for causing the drum to rotate. As best shown in FIGS. 11 and 12, at the upper end of the bellows 156 there is provided a circular collar member 161 which abuts the peripheral upper edge of the inwardly extending bellows flange 154. At its upper end, the collar member 161 abuts the undersurface of the circular stop plate 162. At its lower end, the collar 161 is connected to the bellows as by being brazed thereto. The stop plate 162 has an axial bore 163 which permits the plate 162 to fit over the stud member 151 so as to rest on an annular surface 164 of the stud member 151. To maintain the stop plate 162 in position, a portion of the stud adjacent to the stop plate is threaded as at 166. A nut 167 is threaded into clamping engagement against the stop plate 162. Disposed within the collar 161 and working between the stop plate 162 and the bellows 156 is a compression spring 171 which operates to bias the bellows 156 to a collapsed condition in the event that the insulating gas pressure within the interrupter 50 falls below a safe operating level.

Around the collar 161 there is engaged a spider 172. A spider 172 is provided with a collar 173 through which a lock screw 174 is threadedly engaged. The lock screw 174 extends into a grove 176 formed on the periphery of the collar 161. Thus, the spider 172 is locked to the collar 161 so as to move vertically with it.

Vertically extending pins 177 and 178 constitute releasable holding means and are threadedly secured in the horizontally diametrically disposed arms 181 and 182 of the spider. These pins slidably extend through bushings 183 and 184 provided in the stop plate 162. As best shown in FIG. 12, the upper ends of the pins 177 and 178 extend on opposite sides of a horizontal bar 186 that is supported on the upper end of the stud member 151 for free rotation relative to the stud. A cylindrical drum 189 is attached to the ends of the bar 186. Operating between the drum 189 and the stop plate 162 is a tension spring 191. One end of the spring 191 is attached to an anchor point 192 carried by the bar 186. The opposite end of the spring 191 is secured to an anchor point 193 carried by the stop plate 162. The anchor points 192 and 193 are spaced apart relative to each other a distance sufficient to place the spring 191 under a predetermined amount of tension.

The entire assembly is held in a vertically oriented position by means of a plurality of studs 194 which are threadedly engaged in suitable threaded openings provided in the top of the cap 47. One of the studs 194 is shown in FIG. 11, while in FIG. 12 the spaced relationship of the studs to each other is indicated. The studs 194 extend upwardly and through the stop plate 162. Each stud, as exemplified by the stud 194 in FIG. 11, has a lower nut 196 which abuts the undersurface of the stop plate 162. An upper nut 197 effectively clamps the plate 162 on the lower nut 196. Thus, the three studs 194 effectively support the entire assembly in a predetermined vertical positioning within the housing 146.

When the pressure of the insulating gas within the interrupter 50 falls below a safe operating level, the pressure exerted by the gas on the bellows flange 154 will be less than the force which is exerted on the bellows by the spring 171. Under this condition, the bellows 156 will contract downwardly drawing the collar 161 and the spider downwardly with it. As a result of the downward movement of the spider 172, the pins 177 and 178 are also drawn downwardly below the lower edge surface of the drum bar 186. This action disengages the pins from their stopping engagement with the drum. When the pins are retracted, the tension spring 19 operates to effect rotation of the drum 189 in a counterclockwise direction, as viewed in FIG. 12. As a result, a color-coded, for example, red portion of the drum 189 will be rotated into a position wherein the warning color code will be in registration with a viewing window 198 inserted into a suitable opening 199 in the housing 146. Thus, operating personnel are clearly alerted to the condition of the interrupter 50.

The embodiments of the invention in which an exclusive property or privilege is claimed are defined as follows:

1. In a pressure condition indicating device for a pressurized electrical envelope;
   - an indicator drum rotatably journaled for movement from a first condition indicating position to a second, different condition indicating position;
   - a biasing spring operably connected to bias said drum from its first position to its second position;
   - a stop plate supported in fixed relationship to the envelope;
   - releasable holding means having a first end and a second end, said second end extending into interfering engagement with said drum for maintaining said drum in the first position, said holding means extending through said stop plate;
   - an actuator means after operably coupled to the second end of said releasable holding means to effect a release of said holding means from said drum to free said drum for movement to its second position by operation of said biasing spring, said actuator including a bellows connected in sealed relationship to the envelope in a manner to be responsive to the pressure within the envelope wherein a drop in pressure in the envelope below a predetermined value effects operation of said actuator, a tubular collar disposed in abutting engagement with said stop plate and secured to said bellows, a compression spring disposed in coaxial relationship within said collar and working between said stop plate and said bellows, and means connecting said collar to said releasable holding means; and
   - a pinch filler tube sealingly coupled to said bellows to communicate with the interior of said envelope and extending upwardly through said collar;
   - whereby a drop in pressure within the envelope below a predetermined value will result in the collapse of said bellows under the influence of said compression spring and said collar being secured to said bellows will be drawn downwardly to thereby effect the release of said holding means from said indicator drum and said drum under the influence of said biasing spring is moved from its first condition indicating position to its second condition indicating position.

2. A condition indicating device according to claim 1 wherein there included a stud member having an axial bore, said stud extending through said stop plate and being secured thereto, said stud serving as a pivot post for said indicator drum;
   - said releaseable holding means includes a pair of pins which extend through said stop plate into engagement with said drum in a manner to prevent its movement about said stud in either direction, said pins being connected to said collar; and, said pinch filler tube extends through the bore of said stud in spaced relationship to the wall of the bore.

3. A condition indicating device for a pressurized electrical envelope according to claim 2 including a support secured to the envelope and operably connected to support said drum, said releaseable holding means and said actuator in a fixed position relative to the envelope.

* * * * *